United States Patent

Horn et al.

Patent Number: 6,047,812
Date of Patent: Apr. 11, 2000

[54] ASYNCHRONOUS SOFT CONVEYOR SYSTEM

[75] Inventors: George W. Horn, Concord, Mass.; Warren J. Clement, Hollis, N.H.; Adrian L. Pyke, Reading; Christopher M. Anthony, Natick, both of Mass.

[73] Assignee: Middlesex General Industries, Inc., Woburn, Mass.

[21] Appl. No.: 08/924,294

[22] Filed: Sep. 5, 1997

[51] Int. Cl.[7] ................................................ B65G 47/29
[52] U.S. Cl. .................................. 198/781.06; 198/460.3
[58] Field of Search ........................... 198/781.06, 460.1, 198/460.3

[56] References Cited

U.S. PATENT DOCUMENTS

| | | | |
|---|---|---|---|
| 4,793,262 | 12/1988 | Horn | 104/168 |
| 5,086,910 | 2/1992 | Terpstra | 198/781.06 |
| 5,285,887 | 2/1994 | Hall | 198/781.06 |
| 5,318,167 | 6/1994 | Bronson et al. | 198/781.06 |
| 5,538,097 | 7/1996 | Bakkila et al. | 198/781.06 |

Primary Examiner—William E. Terrell
Assistant Examiner—Mark Deuble
Attorney, Agent, or Firm—Perkins, Smith & Cohen; Jerry Cohen; Harvey Kaye

[57] ABSTRACT

An asynchronous conveyor system with controlled smooth stopping and starting. The conveyer system defines a path with sections (Z1 . . . Z6) independently driven. The conveyed items (2A, . . . 2D) may be independently accumulated on one or more path sections of the conveyor system. External sensors (8, 8A, 14, 14A) are distributed along different path sections of the conveyors system and are used to control the location and the flow of items in either direction. An idler wheel with a sensed rest position is also disclosed as an item sensing mechanism. The drive system for the conveyor system may be stepper motors, DC, AC, hysteresis motors or other such motors. In each case the motors are controlled to provide smooth transportation of the items. In another embodiment, servomotors are used and an internal sensed characteristic of the servo motor provides and indication of an item being on the conveyor path section associated with the servo. The operation then is similar to the use of an actual sensor. The logic controller for the conveyor system may be locally distributed or centrally located.

6 Claims, 3 Drawing Sheets

ASYNCHRONOUS SOFT CONVEYOR SYSTEM

FIELD OF THE INVENTION; RELATED APPLICATIONS

Priority is claimed under 35 U.S.C. § 119 (e) from the Provisional Application, entitled, "SOFT BUFFERING CONVEYOR SYSTEM, filed on Sep. 6, 1996.

The present invention relates to conveyor transportation systems for materials, workpieces or other such items from station to station (the stations being workstations or any milestone points) and where generation of particulate matter is minimized for compliance to "clean room" specification and where the items being conveyed are substantially conveyed independently. This invention is closely related to U.S. Pat. No. 4,793,262 ('262), of common assignment therewith, and the disclosure of the '262 patent is incorporated by reference herein as if set out in full herein.

BACKGROUND OF THE INVENTION

The '262 patent provides for and teaches a conveyor system where the items being conveyed gently bump into each other. But, rather than having the physically driven belt or drive wheel slip against the item thereby necessarily generating dust or particulate matter from the slipping, the system described in the '262 patent provides for magnetic slipping of a hysteresis clutch. In one embodiment a controlled step device arrests forward motion of one item on the conveyor and the magnetic slippage occurs in the drive of the conveyor. The magnetic slipping produces no dust or particulate matter. However, successive items behind the stopped item may accumulate behind it. In practice the items being transported may be pallets, cassettes or containers carrying workpieces. In some applications the workpiece itself may be conveyed without such a carrier.

An advantage of the '262 patented system is the asynchronous or independent manner of handling the items being transported. The transportation path is segmented into sections which are independently driven. If an item on a section is stopped, the previous sections will continue to transport each successive item until there is a continuous line of items with no gaps. Items ahead of a stopped item proceed with no regard to the lined up array behind. This type of operation is in direct contrast to a continuous belt conveyor where gaps between items on the belt remain, and where stopping one item requires stopping the entire belt and therefore all the items, unless the system allows the belt to slip. However, this type of conveyor system is generally unsuitable for "clean room" conveyors. The present invention includes an alternative approach to such selective item stopping and accumulating of successive stopped items.

It is an object of the present invention to eliminate the physical bumping of successive conveyed items into each other.

It is another object of the invention to provide a further enhancement in preventing the generation of dust or particulate matter while physically moving items from station to station.

It is another object of the invention to provide a conveyor system wherein various items are selectively stopped and started along the conveyor path and selectively stopped and accumulated in a controlled fashion.

It is yet another object of the invention to provide a conveyor system with intrinsic controls as well as external automatic or manual controls. A related object of the invention is to provide a system wherein the item locations are controlled either locally, with controls related to each of the successive sections of the conveyor path communicating with each other, or universally, wherein controls related to all sections of the conveyor path communicating with each other directly or via a universal server.

SUMMARY OF THE INVENTION

The foregoing objects are met in a conveyor system for transporting items along a path divided into discrete sections, and where the transporting is logically controlled. The conveyor system comprises: means for moving items along the path, means for sensing when an item is located on any sections, and, responsive to said means for sensing, means for controlling the means for moving, such that the location of the items are controlled relative to each other.

Asynchronous soft conveying provides for a process for moving items independent of each other, and starting and stopping the items in a smooth fashion. An effect of such moving of items is that they may be prevented from bumping each other by controlling the conveyor.

In a preferred embodiment, using sensors to detect the location of items on the conveyor and magnetic hysteresis drives as described in the '262 patent, provides the mechanism for a soft buffered asynchronous conveyor. The conveyor may be divided into sections with sensors located on each section. The drive for each section and the sensors for each section of the conveyor can be operated such that each section can be occupied by only one item. When an item occupies a given section, the drive for the preceding section is stopped when an item occupies this preceding section. In a preferred embodiment, this can be a single relay that is activated by the detection of the item on the given section, and when so activated disconnects power to the preceding section drive. The hysteresis drive inherently provides for a smooth stop when power is disconnected. When items being conveyed are sensed on sections of an asynchronous conveyor, soft buffering is intrinsic by controlling the stopping (and starting) of the drives by known methods. For example, use of the magnetic hysteresis system provides inherent smooth stops, and known driving techniques for stepping motors or servo motors provide similar controlled stops.

The conveyor system, in a preferred embodiment, may include an optical sensor located to detect the absence or presence of an item on each section along the path. The sensor may be positioned across the path to detect the presence or absence of a carrier or container for an item or a workpiece on a carrier or in a container, if any, or a signal flag portion of an item or carrier, if any, traveling along the path. In one embodiment the conveyed item or a portion of it interrupts an optical, acoustic or other radiant energy beam between a source and a sensor, or the item or a portion of it may reflect a beam from a source to a sensor. Other characteristics or parameters (e.g., item height, orientation, configuration, weight, magnetism, electrical properties, etc.) may be detected with specific. For example, in a preferred embodiment, a magnetic sensor may be used to advantage to detect the presence or absence of an iron workpiece. Instead of beams, radiant energy waveforms or electrical charge can be used for detection (interference patterns, capacitive or voltage gradients, varying electrical current, diffraction, back EMF, etc.)

When an item is detected first along a conveyor path section and there is another item on the next successive adjacent section, the system may determine that the latter section should be stopped to avoid an unwanted accumulation. A controller or computing system is provided, in a preferred embodiment, to receive the sensor outputs, make the logical determination to stop a section, and then stop the motor for that section in a controlled fashion, as is known in the art. The communication, in a preferred embodiment, may be local between adjacent sections for the stopping and starting of the conveyor, or a more universal controller may be used. Using such systems the positions of the items on the conveyor can be controlled as the application may allow or require. When the drive is formed from an electric motor and hysteresis clutch, as in the '262 patent, removing the drive from the motor stops the system, and via the hysteresis clutch the section and the item will come smoothly to a stop. Such stopping inherently will prevent collisions. A stepping motor drive, using sensors for detecting the conveyed items, can be operated in a similar fashion as the just described hysteresis clutch system, including the elimination of the bumping of the items being conveyed. When the drive motor is a stepping motor, there are known techniques to ramp down the occurrence of drive steps to smoothly stop the motion of the conveyed item. In a similar manner, when the motion is to be resumed there are known techniques to smoothly start the system by ramping up the drive signals to a stepping motor to restart the motion smoothly. This can be done in addition to or instead of using a hysteresis clutch as described above.

In another preferred embodiment, servomotors may be used in place of stepping motors. It is known in the art to smoothly start or stop these types of motors. Typically, as known in the art, a feed back mechanism in the servomotor controller drive is utilized to control or servo the motors against some parameter. An error signal is generated in the system and can be made available for detection purposes. In this preferred embodiment, the error signal may be sensed to detect when an item is newly placed on or removed from the path section. This detection is well known in the art, and is equivalent to the use of discrete sensors, with the exception that the sensor may be placed to indicate where on the section an item resides. In contrast, with a back electromotive force (EMF) detection scheme, the location can only be estimated. Other parameters of the servo motor may be detected, including, but not limited to, back EMF and drive current.

The inventive system may be designed for moving items bi-directionally along the conveyor path. In this case, additional sensors may be used to determine when an item is ready to move along a section or from one section to the next section in either direction.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
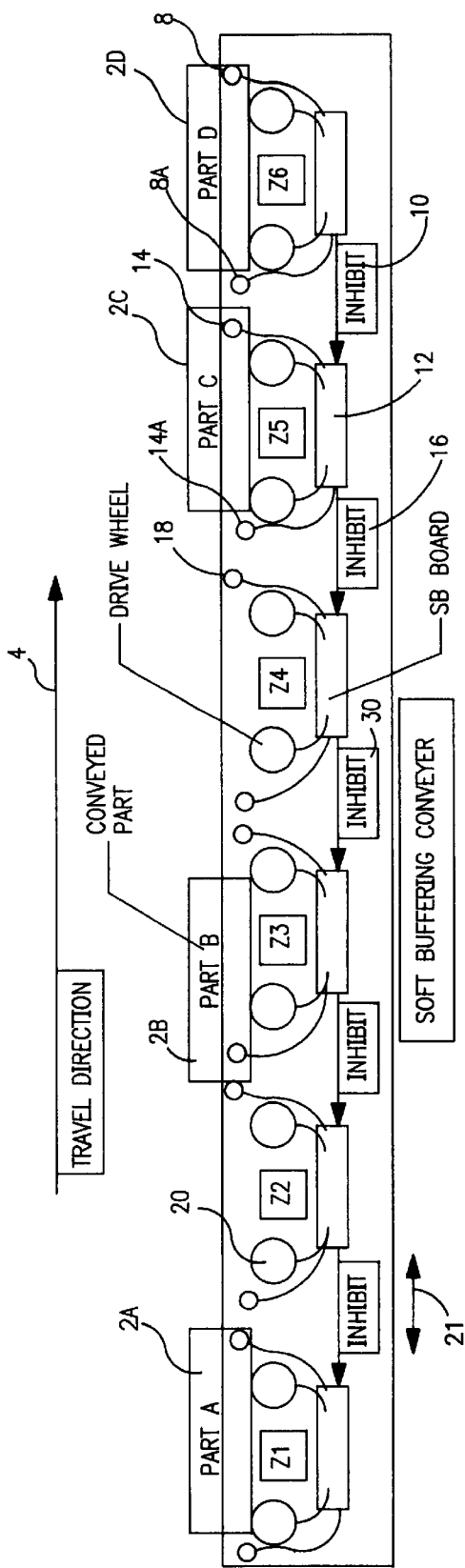
FIG. 1 is a block diagram/schematic of a preferred embodiment of the conveyor system of the present invention.

FIG. 1 shows a preferred embodiment of the system of the present invention in block diagram form comprising a zoned (Z1, Z2 ... Z6) conveyor with a drive system for items 2A, 2B, 2C, and 2D to travel in the direction of the arrow 4. Item 2D is positioned at the far right end of the conveyor, in zone Z6. An optical detector 8 is positioned to recognize the presence of item 2D and, in response thereto, sends an inhibit signal 10 back to the drive system 12 for zone Z5. This causes the drive 12 to stop, ensuring that item 2C does not travel into zone Z6 and come too close to item 2D. The sensor 14 in zone Z5 sends an inhibit signal 16 back to the drive for Z4 that will prevent the drive of Z4 from transporting an item into Z5. In the actual case in FIG. 1, since there is no item in Z4, sensor 18 detects no item and active inhibit 20 is sent to the drive for Z3. The Z3 drive is on and the Z4 drive is on. Item 2B will be driven into zone Z4 until item 2B is detected by sensor 18 which will cause the drive for Z4 to stop if the inhibit 16 still exists from zone Z5. In a similar manner the items will line up one after another in successive zones or sections of the conveyor system. The items shown in FIG. 1 will be finally located with item 2D on zone Z6, item 2C on zone Z5, item 2B on zone Z4 and item 2A on zone Z3. The system designer may place the items on any other locations on the conveyor as the designer may determine.

In FIG. 1, the control logic, as described above, may be local between adjacent section along the conveyor path with no other control between the zones needed. The control logic is, as follows: if an item is located on a given section an inhibit signal is sent to the previous section; if an item is located on the previous section, the drive for the previous section is off. This can be stated as a logic "and" condition. That is: if both the next section and the immediate section have items thereon, the immediate section's drive is shut down or off. If there were to be bi-directional drive, additional sensors would be placed at the other end of each section, for example, 8A and 14A. These sensors would detect items moving from one section to the next adjacent section in the opposite direction from the arrow 4. In addition all the inhibit signals must be capable of being sent in both directions, as indicated by the arrow 21. The operation of bi-directional drive may be implemented as described above in a straight forward manner. At the ends of the conveyor path external apparatuses must communicate with the both end sections of the conveyor to load and unload the conveyed items in accordance with the controlled conveyor.

If the sensors 8, 8A, 14, etc. in FIG. 1 are disregarded, the detection of error signals, back electro-motive force (EMF), drive current or velocity feedback of the motor drive assemblies can be used as sensor signals (similar to use of the physical sensors above) for asynchronous control of the flow and location of items on the conveyor without the items colliding. The inhibit signals would be generated as shown in FIG. 1 from one section to the preceding section. One preferred embodiment would be to drive the conveyor with DC motors and arrange these motors to be nominally running at a slow speed opposite the direction of travel 4. The motors are controlled using velocity feedback, but in a torque limited mode allowing the drive wheel to be easily stalled and forced into the opposite direction. Operation is as follows: consider the drive for zone Z2 to be moving the opposite the arrow 4, and the drive for zone Z1 is moving the item 2A in the direction of the arrow 4. When item 2A touches the drive wheel 20, there is an immediate stall and direction reversal of wheel 20, the velocity feedback changes dramatically. The velocity feedback change is detected and the motor controller drives the wheel 20 to move the conveyor section and the item 2A in the direction of the arrow. If there is an item in zone Z3, as shown item 2B, the inhibit signal 30 from zone Z3 stops the drive for zone Z2. The controller driving the DC motor for zone Z2 is arranged to stop the item in a smooth manner.

Figure 2:
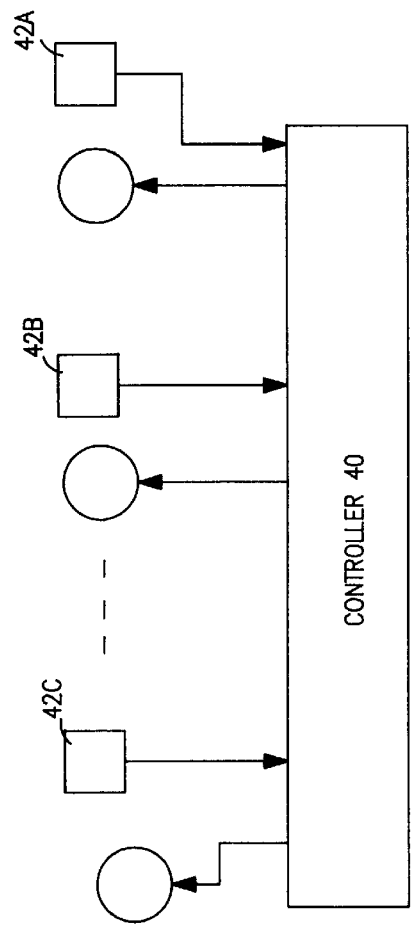
FIG. 2 is a block diagram of a preferred controller in two states of operation.

FIG. 2 shows a single controller 40 that is arranged to receive the sensor signals 42A, 42B, and 42C from the conveyor system. These signals are representative of the actual sensors 8, 8A, 14, etc. or from the detected parameters from a servo motor drive system. The controller, in response to the sensed signals, may be programmed to output drive signals to the motors to control the location of the items, as described above. The controller 40 may be any combinations of commercial controllers available, or personal or other small or larger computer or computers. The controller 40 may even be remote from the conveyor and signals are sent via a communication network. The operation will be similar to that described above. In such a case the algorithms may be implemented as is well known in the art. However, such a controller may be programmed to perform a wide variety of operations for locating and moving items as applications require.

Figure 3A:
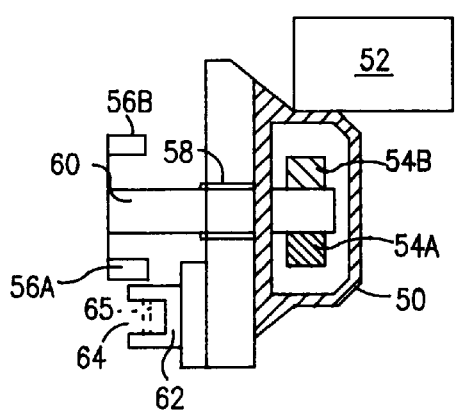
FIGS. 3A and 3B are side views (partially sectioned) of a dual flag sensor apparatus in two states of operation.

FIG. 3A shows the dual flag sensor parts of another preferred embodiment of the present invention. A pallet 52 is positioned on a counter weighted or unbalanced idler wheel 50. The unbalance is achieved by making the bushing fixed to the idler wheel in two halves 54A and 54B of different materials such that one half 54A is heavier, stainless steel (SSTL) in this case, and the lighter half, 54B, is plastic. The unbalance can also be achieved by fixing a weight to the wheel or any structure fixed to the wheel. Other known techniques can be used to achieve this weight unbalance. The idler wheel is supported by a pair of bearings 58 and rigidly connected to a two sided flag 56 by a shaft 60. The rigid connection fixes the relative position relative of the flag extensions 56A or 56B to the unbalanced wheel. In this embodiment, the flag 56A is arranged to be at the lowest possible position when the heavier bushing part 54A is at its lowest possible position. An optical sensor 62 has a slot 64 with an optical (light or infrared) beam 65. The slot is located to allow flag 56A or 56B to break the beam. As the idler wheel is rotated by friction of the pallet moving on the idler wheel, the flags move in and out of the beam. This indicates that a pallet is positioned and moving on that section of the conveyor. If the pallet stops, say due to an inhibit signal of a pallet on the next successive section, while on the idler wheel and the flag 56A or 56B intersects the optical beam 65, the drive for the section will move the pallet enough to rotate the flag out of intersecting the beam. In this position the system "knows" that the pallet is stopped on that section.

Figure 3B:
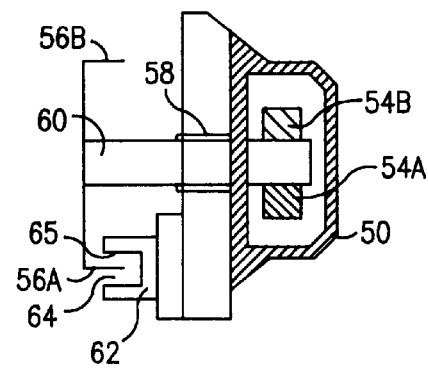

FIG. 3B shows the unbalanced idler wheel 50 with no pallet contacting the idler wheel. The unbalanced bushing 54A, when the idler wheel is free to rotate unimpeded by a pallet contacting it, will cause the idler wheel to come to a rest position due to gravity forcing the weighted half 54A to be at the lowest point permitted by the structure. The flag 56A is directly in the gap 64 of the optical sensor 62 breaking the beam 65. In this state the system "knows" that there is no pallet in this section of the conveyor.

With reference to FIG. 3A, the sensor 62 could be a mechanical sensor as known in the art, including, but not limited to, a mechanical switch.

Figure 4:
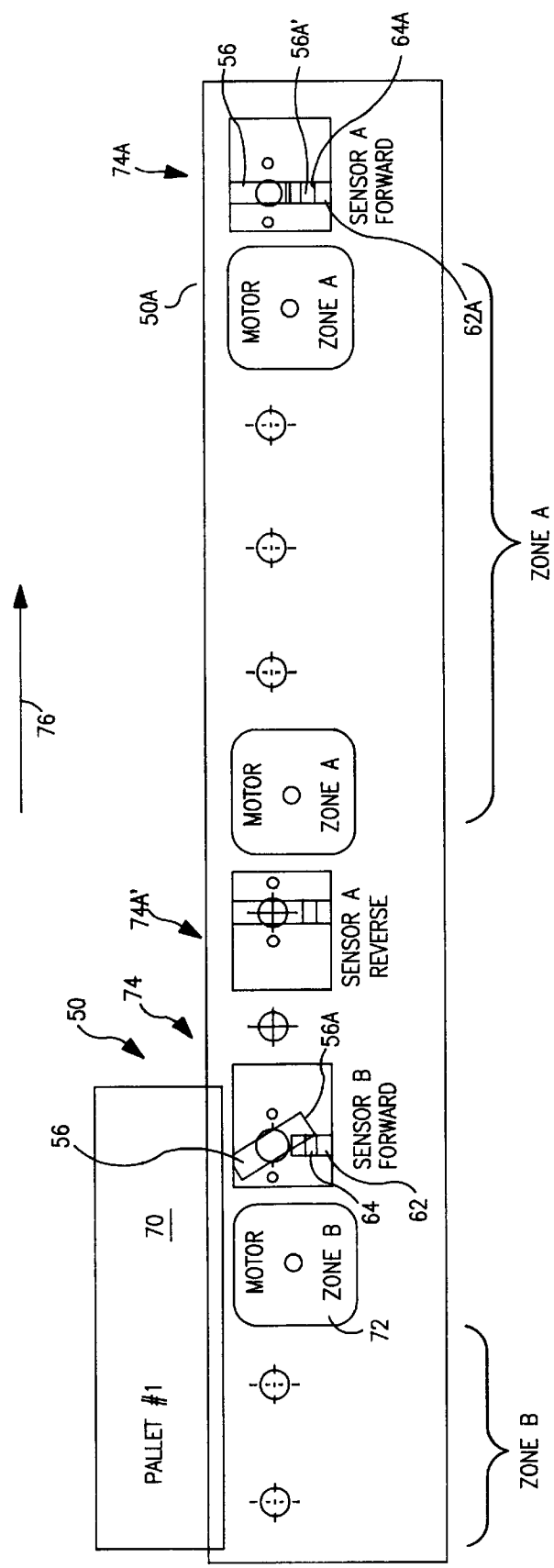
FIG. 4 is a diagrammatic view of a conveyor system of another preferred embodiment incorporating the sensor of FIGS. 3A and 3B.

FIG. 4 shows a conveyor system, diagrammatically with a pallet item 70 being driven by the motors 72 in conveyor path section zone B. The two flag sensor 74 is fixed to an idler wheel 50 not seen behind the sensor 74. The sensor 74 is positioned to detect the pallet 70 while the pallet is moving in the direction of travel arrow 76. As can be seen the flag sensor end 56A is not in the slot 64 of the optical sensor 74. In this case the pallet could be stopped and the system "knows" that the pallet is in zone B since the sensor beam is not broken. If the pallet stopped with the flag 56A breaking the beam (not shown) the system would drive the motors 72 to cause the pallet to move enough to bring the flag 56A out of the beam. If no pallet were in zone B, the idler would be free to react to gravity causing the idler to find its rest position with the weighted bushing at the lowest position possible. Sensor assembly 74A is an example. The flag 56A' interrupts the beam in the optical sensor 62A slot 64A. In this arrangement the system "knows" that there is no pallet in zone A. An idler assembly is shown 74A' arranged for sensing item motion opposite the arrow 76. Similar operation occurs, and with each section of the conveyor path having dual idler wheel sensor assemblies and with appropriate control, a bi-directional conveyor is formed.

The motors driving this preferred embodiment can be of virtually any type, including the above mentioned hysteresis/clutch, stepping, and servo motor.

The asynchronous conveyor systems, exemplified above, where the section drives for the conveyor may be stopped, provide separation of the items being conveyed. To control such flow of work, external or internal (e.g. velocity feedback in the above servo system) sensors can be used. Thus a corollary of asynchronous conveying is the capability to buffer a work process using such a conveyor system. The separation of the items being conveyed is an issue of sensing, while stopping the items softly is an issue of decelerating the drive means for each item before coming to a complete stop. The stopping and starting of the different drive types, as described above, can be designed and arranged for smooth starting and stopping.

Although, the preferred motors are electronic motors in the present examples, hydraulic motors, air driven motors and the like may be used to advantage in other preferred embodiments and applications.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Conveyor system for controlled transportation of items along a path, where the transportation is logically controlled, comprising:
   (a) means defining a sequence of transportable items;
   (b) means defining a conveyor path with driven sections along the path;
   (c) means for selectively driving sections to selectively transport the items along the sections and from section to section;
   (d) means for sensing when items are located on specific sections, said means for sensing including:
      (1) an idler wheel contacting and sensing items being transported over the idler wheel,
      (2) means for defining a rest position for said idler wheel, said rest position occurring when no item is in contact with the idler wheel, and
      (3) means for determining when said idler wheel is in said rest position, said means for determining including:
         (i) a mechanical flag fixed to said idler wheel and rotating with said idler wheel, said flag arranged to be located in a first position when said idler wheel is in said rest position, and (ii) a sensor located to detect said mechanical flag is in said first position;

(e) means for controlling the means for selectively driving such that the location of the items are controlled relative to each other in response to said means for sensing.

2. The conveyor of claim 1 wherein said mechanical flag comprises opposing extensions.

3. Conveyor system for controlled transportation of items along a path, where the transportation is logically controlled, comprising:

(a) means defining a sequence of transportable items;

(b) means defining a conveyor path with driven sections along the path;

(c) means for selectively driving sections to selectively transport the items along the sections and from section to section;

(d) means for sensing when items are located on specific sections, said means for sensing including:

(1) an idler wheel contacting and sensing items being transported over the idler wheel, (2) means for defining a rest position for said idler wheel, said rest position occurring when no item is in contact with the idler wheel, said means for defining a rest position including:

means for unbalancing said idler wheel, such that gravity will force said wheel into said rest position and (3) means for determining when said idler wheel is in said rest position; and (e) means for controlling the means for selectively driving in response to said means for sensing such that the location of the items are controlled relative to each other.

4. A conveyor system for clean room environments to provide controlled transportation of items along a path, where the transportation is logically controlled, comprising:

means defining a sequence of transportable items, means defining a conveyor path with driven sections along the path, means for selectively driving sections to selectively transport the items along the sections and from section to section, means for sensing when items are located on specific sections, responsive to said means for sensing, means for controlling the means selectively driving such that the location of the items are controlled relative to each other, and the driven sections are started and stopped in a controlled manner that results in smooth starts and stops of the driven sections sufficient to prevent slippage of the conveyor driven sections and items being transported thereby, the means for driving including a servomotor and wherein the means for sensing includes means for sensing any changed parameter in the servomotor driving a path section when an item is newly placed on that path section, the changed parameter which is sensed being back EMF, drive current, velocity feedback or error signals.

5. Conveyor system for clean room environments to provide controlled transportation of items along a path, where the transportation is logically controlled, comprising:

(a) means defining a conveyor path with driven sections along the path for moving items along said path;

(b) means for selectively driving said sections to selectively transport the items along the sections and from section to section;

(c) means for sensing when items are located on specific sections, said sensing means including:

(i) a sensor located to detect the absence or presence of an item on each section along the path, (ii) an idler wheel out of the path of movement of items for sensing items being transported over the idler wheel, (iii) means for defining a rest position for said idler wheel, said rest position occurring when no item is in contact with the idler wheel, and (iv) means for determining when said idler wheel is in said rest position; and (d) means for controlling the means for selectively driving, in response to said means for sensing, such that the location of the items are controlled relative to each other, and the driven sections are started and stopped in a controlled manner to be smooth.

6. The conveyor system of claim 5 wherein the sensor is an optical sensor.

* * * * *